US012786842B2

(12) United States Patent
Otaka et al.

(10) Patent No.: US 12,786,842 B2
(45) Date of Patent: Nov. 3, 2026

(54) WIRELESS COMMUNICATION DEVICE, CONTROL METHOD THEREFOR, VEHICLE, STORAGE MEDIUM, AND WIRELESS COMMUNICATION SYSTEM

(71) Applicant: HONDA MOTOR CO., LTD., Tokyo (JP)

(72) Inventors: Masaru Otaka, Tokyo (JP); Shohei Tsukahara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 634 days.

(21) Appl. No.: 17/899,791

(22) Filed: Aug. 31, 2022

(65) Prior Publication Data

US 2023/0075177 A1 Mar. 9, 2023

(30) Foreign Application Priority Data

Sep. 7, 2021 (JP) ................................ 2021-145680

(51) Int. Cl.
*H04W 40/22* (2009.01)
*H04W 84/12* (2009.01)

(52) U.S. Cl.
CPC ............ *H04W 40/22* (2013.01); *H04W 84/12* (2013.01)

(58) Field of Classification Search
CPC .............................. H04W 40/22; H04W 84/12
See application file for complete search history.

(56) References Cited

U.S. PATENT DOCUMENTS

| | | | | |
|---|---|---|---|---|
| 8,849,999 | B2 * | 9/2014 | Miyashita | H04L 43/0817 709/224 |
| 9,258,765 | B1 * | 2/2016 | daCosta | H04L 43/08 |
| 12,021,786 | B2 * | 6/2024 | Xu | H04L 1/18 |
| 2015/0373553 | A1 * | 12/2015 | Chiba | H04W 72/02 370/310 |

(Continued)

FOREIGN PATENT DOCUMENTS

| | | |
|---|---|---|
| JP | 2006-148322 A | 6/2006 |
| JP | 2015-154193 A | 8/2015 |

(Continued)

OTHER PUBLICATIONS

Office Action dated Jun. 28, 2025, issued in counterpart CN Application No. 202211019879.5, with English translation. (18 pages).

*Primary Examiner* — Iqbal Zaidi
*Assistant Examiner* — Andrew Shaji Kurian
(74) *Attorney, Agent, or Firm* — WHDA, LLP

(57) ABSTRACT

A wireless communication device includes a wireless communication unit configured to perform wireless communication, an acquisition unit configured to acquire an operating state of the wireless communication unit after the wireless communication unit is connected to an access providing device capable of providing access to a network, a determination unit configured to determine whether the operating state of the wireless communication unit satisfies a notification condition, and a notification unit configured to notify another wireless communication device that the wireless communication unit is capable of relaying access to the network in a case where it is determined that the operating state of the wireless communication unit satisfies the notification condition.

18 Claims, 5 Drawing Sheets

(56) References Cited

U.S. PATENT DOCUMENTS

| | | | | |
|---|---|---|---|---|
| 2016/0174123 | A1* | 6/2016 | Hedberg | H04W 36/22 370/331 |
| 2017/0245197 | A1 | 8/2017 | Onishi et al. | |
| 2018/0103859 | A1* | 4/2018 | Provenzano | A61B 5/0024 |
| 2020/0068632 | A1* | 2/2020 | Kato | H04B 7/155 |
| 2021/0037438 | A1* | 2/2021 | Uchiyama | H04W 40/22 |
| 2022/0022116 | A1* | 1/2022 | Hasegawa | H04W 36/38 |
| 2022/0038307 | A1* | 2/2022 | Yasunori | B60W 60/001 |
| 2022/0070706 | A1* | 3/2022 | Kusashima | H04W 48/20 |
| 2022/0377571 | A1* | 11/2022 | Yuan | H04W 28/0231 |
| 2023/0180097 | A1* | 6/2023 | Zhang | H04B 7/1555 370/315 |
| 2023/0217293 | A1* | 7/2023 | Matsunaga | H04W 56/001 709/224 |
| 2023/0300226 | A1* | 9/2023 | Hoshino | H04W 4/44 709/224 |
| 2023/0403624 | A1* | 12/2023 | Ohta | H04W 72/54 |

FOREIGN PATENT DOCUMENTS

| | | | | |
|---|---|---|---|---|
| JP | 2016-076911 | A | 5/2016 | |
| JP | 2020-182110 | A | 11/2020 | |
| WO | WO-2013099026 | A1 * | 7/2013 | G06F 1/12 |

* cited by examiner

WIRELESS COMMUNICATION DEVICE, CONTROL METHOD THEREFOR, VEHICLE, STORAGE MEDIUM, AND WIRELESS COMMUNICATION SYSTEM

CROSS-REFERENCE TO RELATED APPLICATION(S)

This application claims priority to and the benefit of Japanese Patent Application No. 2021-145680 filed on Sep. 7, 2021, the entire disclosure of which is incorporated herein by reference.

BACKGROUND OF THE INVENTION

Field of the Invention

The present invention relates to a wireless communication device, a control method therefor, a vehicle, a storage medium, and a wireless communication system.

Description of the Related Art

Technologies in which wireless communication devices mounted in vehicles access the Internet via wireless local area networks (wireless LANs) while the vehicles are traveling are known. Japanese Patent Laid-Open No. 2016-76911 proposes a technology for improving communication efficiency according to a magnitude relationship of communication opportunities with an access providing device that provides access to the Internet. In narrow-area communication such as a wireless LAN having a small communicable area, there is a possibility of wireless connection between an access point and a client being disconnected in a short time in a vehicle having large mobility. Therefore, in the technology of Japanese Patent Laid-Open No. 2016-76911, an access point to which the wireless connection device is connected cannot be appropriately selected in some cases.

SUMMARY OF THE INVENTION

An aspect of the present disclosure provides a technology for enabling a wireless communication device to appropriately select a connection destination.

In an embodiment, a wireless communication device comprising: a wireless communication unit configured to perform wireless communication; an acquisition unit configured to acquire an operating state of the wireless communication unit after the wireless communication unit is connected to an access providing device capable of providing access to a network; a determination unit configured to determine whether the operating state of the wireless communication unit satisfies a notification condition; and a notification unit configured to notify another wireless communication device that the wireless communication unit is capable of relaying access to the network in a case where it is determined that the operating state of the wireless communication unit satisfies the notification condition is provided.

DESCRIPTION OF THE EMBODIMENTS

Figure 1:
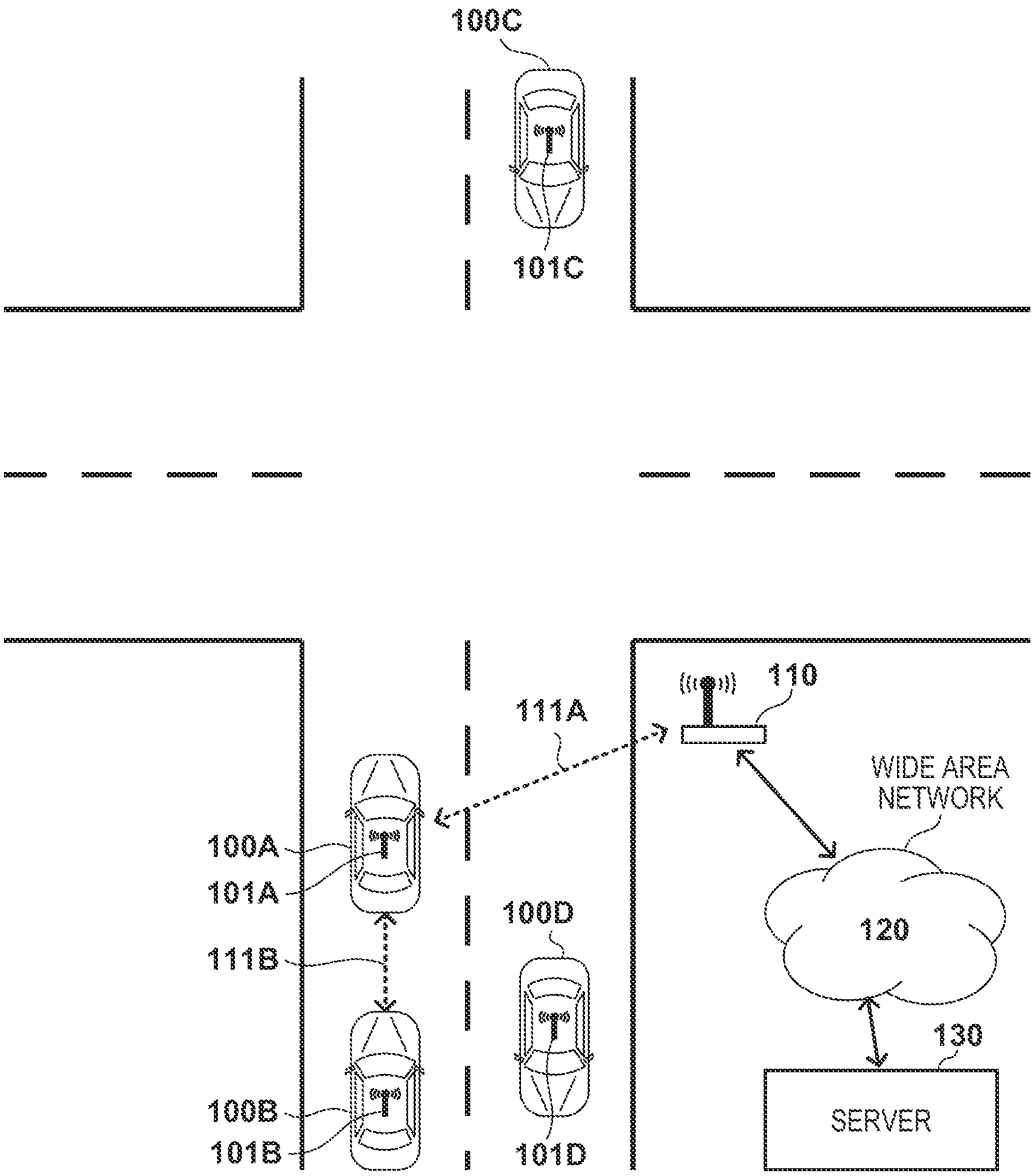
FIG. 1 is a schematic diagram illustrating an overview according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

An overview of an embodiment will be described with reference to FIG. 1. An embodiment relates to a wireless communication device, and in particular, to a wireless communication device included in a mobile body. Hereinafter, a vehicle is treated as an example of a mobile body. Instead of this, the mobile body may be any device of which a geographical position changes during operation, such as a drone or other unmanned aerial vehicle. The vehicle may be a four-wheeled vehicle, a two-wheeled vehicle, or another type of vehicle. The wireless communication device included in the vehicle may be a wireless communication device mounted in a vehicle or a wireless communication device (for example, a mobile phone of a passenger of the vehicle) temporarily carried into a vehicle.

Vehicles 100A to 100D illustrated in FIG. 1 have wireless communication devices 101A to 101D, respectively. Hereinafter, the vehicles 100A to 100D are collectively referred to as a vehicle 100. The description of the vehicle 100 applies to any of the vehicles 100A to 100D. Similarly, the wireless communication devices 101A to 101D are collectively referred to as a wireless communication device 101. The description of the wireless communication device 101 applies to any of the wireless communication devices 101A to 101D.

The wireless communication device 101 can operate as a client (which may also be referred to as an extension device, an STA, a terminal, or the like) of a wireless local area network (LAN), such as Wi-Fi (registered trademark). That is, the wireless communication device 101 is connected to an access point (which may also be referred to as a base device or the like) of a wireless LAN and can access an external network through the access point. For example, it is assumed that the communication device 110 is installed near a road on which the vehicle 100 is traveling, and the communication device 110 operates as an access point of the wireless LAN. The wireless communication device 101 can establish a wireless connection with the communication device 110 when the wireless communication device 101 is within a communication range of the communication device 110.

The communication device 110 can access the wide area network 120 (for example, the Internet) through a wired connection or a wireless connection. The wireless communication device 101 connected to the communication device 110 can access the wide area network 120 through the communication device 110. Hereinafter, a device such as the communication device 110 capable of providing the wireless communication device with access to the wide area network 120 is referred to as an access providing device. A server 130 or the like is also connected to the wide area network 120. The wireless communication device 101 connected to the communication device 110 can communicate with the server 130 through the communication device 110.

The communication device 110 may be installed in a place where the vehicle 100 is expected to often decelerate or temporarily stop (for example, near a traffic light or near an intersection). By being installed in such a place, the wireless communication device 101 can stay connected to the communication device 110 for a relatively long time. The communication device 110 may be installed in a store such as a convenience store or a gas station. In this manner, the communication device 110 may be fixed at a specific geographical position (in other words, a stationary state) when used.

The wireless communication device 101 may be operable as an access point of the wireless LAN in addition to being operable as a client of the wireless LAN. If the wireless communication device 101 operating as an access point can access the wide area network 120, a client of the wireless communication device 101 can also access the wide area network 120 through the wireless communication device 101. As described above, since the wireless communication device 101 that can access the wide area network 120 and operates as an access point can provide another wireless communication device 101 with access to the wide area network 120, the wireless communication device becomes an access providing device.

In the example of FIG. 1, a wireless connection 111A is established between the communication device 110 and the wireless communication device 101A. In the wireless connection 111A, the communication device 110 operates as an access point, and the wireless communication device 101A operates as a client. In addition, a wireless connection 111B is established between the wireless communication device 101A and the wireless communication device 101B. In the wireless connection 111B, the wireless communication device 101A operates as an access point, and the wireless communication device 101B operates as a client. In this example, the wireless communication device 101A operates as both a client and an access point. The plurality of wireless communication devices 101 connected to each other in this manner constitute a wireless communication system.

The wireless communication device 101B may function as an access point of a wireless LAN and provide another wireless communication device 101 (for example, the wireless communication device 101D) with access to the wide area network 120. In this case, the wireless communication device 101D accesses the wide area network 120 through the wireless communication device 101B, the wireless communication device 101A, and the communication device 110. In this way, one wireless communication device may access the communication device 110 through one or more other wireless communication devices (that is, in a multi-hop manner). In addition, a plurality of wireless communication devices 101 (for example, the wireless communication device 101B and the wireless communication device 101C) may be connected as clients to the wireless communication device 101A operating as an access point.

A plurality of access providing devices may be able to provide the wireless communication device 101B with access to the wide area network 120. For example, it is assumed that both the wireless communication device 101A and the wireless communication device 101D are connected to the communication device 110 and each operates as an access point. When the wireless communication device 101B is within the communication range of each of the communication device 110, the wireless communication device 101A, and the wireless communication device 101D, the wireless communication device 101B may access the wide area network 120 through any one of them. The wireless communication device 101B may select an access point to be connected based on predetermined criteria (for example, communication quality). For example, when a received signal strength indicator (RSSI) of a signal received from the wireless communication device 101A by the wireless communication device 101B is the highest, the wireless communication device 101B may be connected to the wireless communication device 101A.

As described above, the wireless communication device 101A that has established the wireless connection 111A with the communication device 110 may operate as an access point in order to provide another wireless communication device 101 with access to the wide area network 120. Specifically, the wireless communication device 101A may notify (for example, broadcast a service set identifier (SSID)) that the own device can operate as an access point in response to the establishment of the wireless connection 111A with the communication device 110.

As illustrated in FIG. 1, it is assumed that a wireless connection 111A is established between the wireless communication device 101A and the communication device 110. When the wireless connection 111A is disconnected, not only the wireless communication device 101A but also another wireless communication device 101 using the wireless communication device 101A as an access point is no longer able to access the wide area network 120. A communication distance of a present wireless LAN is typically several hundred meters or less. Therefore, for example, when the vehicle 100A is traveling at a high speed, there is a possibility of the connection being immediately disconnected even if the wireless connection 111A is established between the communication device 110 and the wireless communication device 101A.

When the wireless connection 111A is disconnected in a short time, another wireless communication device 101 (for example, the wireless communication device 101B) connected to the wireless communication device 101A is reconnected to another access point in a short time. In this case, non-connection of the wireless communication device 101B to the wireless communication device 101A is less wasteful. Accordingly, in an embodiment, after establishment of connection with an access providing device (for example, the communication device 110), when a condition indicating that the connection can continue for a certain time is satisfied, the wireless communication device 101A may notify another wireless communication device that the own device can operate as an access point. Accordingly, the wireless communication device 101 operating as a client can be connected to an appropriate access point.

The wireless communication device 101B operating as a client becomes unable to access the wide area network 120 not only when the wireless connection 111A is disconnected but also when the wireless connection 111B is disconnected. Accordingly, the wireless communication device 101B operating as a client may be connected to the access point when a connection condition indicating that a possibility of being disconnected is low is satisfied. Accordingly, the wireless communication device 101 operating as a client can be connected to an appropriate access point.

Figure 2:
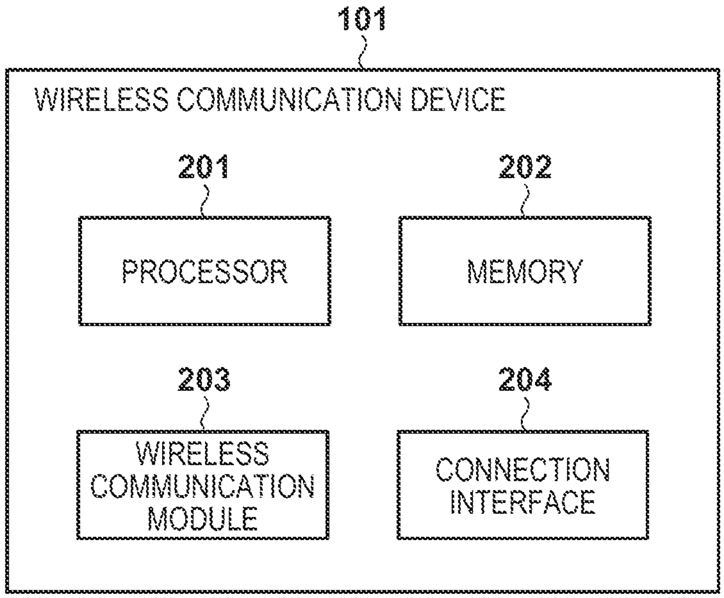
FIG. 2 is a block diagram illustrating a hardware configuration example of a wireless communication device according to an embodiment.

An exemplary hardware configuration of the wireless communication device 101 will be described with reference to FIG. 2. As described above, the description of the wireless communication device 101 applies to any of the wireless communication devices 101A to 101D of FIG. 1. The wireless communication device 101 may include a processor 201, a memory 202, a wireless communication module 203, and a connection interface 204.

The processor 201 generally controls the wireless communication device 101. Specifically, the processor 201 performs various operations. The memory 202 stores data necessary for a process of the processor 201. The memory 202 is realized by, for example, a read only memory (ROM) or a random access memory (RAM). The operation of the wireless communication device 101 may be performed by the processor 201 executing a program stored in the memory 202. Alternatively, some or all of the operations of the wireless communication device 101 may be performed by a dedicated circuit such as an application specific integrated circuit (ASIC) or a field programmable gate array (FPGA).

The wireless communication module 203 performs wireless communication with a communication device (for example, the communication device 110 or another wireless communication device 101) outside the wireless communication device 101. The wireless communication module 203 is realized by, for example, an antenna, a high frequency circuit, a baseband processing circuit, or the like. The wireless communication module 203 conforms to a wireless LAN protocol such as Wi-Fi. As described above, the wireless communication module 203 may function as an access point of a wireless LAN or may function as a client of a wireless LAN. The wireless communication module 203 may conform to a protocol other than the wireless LAN. The wireless communication module 203 may have a plurality of chips to which respective media access control (MAC) addresses are allocated or may have one chip to which a plurality of MAC addresses is allocated.

The connection interface 204 is an interface for connection to the vehicle 100. When the wireless communication device 101 is a wireless communication device temporarily carried into the vehicle 100, the connection interface 204 may be a module for short-range wireless communication or a connector for wired connection. When the wireless communication device 101 can communicate with the vehicle 100 using the wireless communication module 203, the connection interface 204 may be omitted. When the wireless communication device 101 is a wireless communication device mounted in the vehicle 100, the connection interface 204 may be a connector for wired connection. The connection interface 204 may be used to acquire a vehicle speed from the vehicle 100 as described below. When the vehicle speed is not acquired from the vehicle 100, the connection interface 204 may be omitted.

An exemplary functional configuration of the wireless communication device 101 will be described with reference to FIG. 3. The components illustrated in FIG. 3 may be implemented, for example, by the processor 201 executing a program stored in the memory 202.

A client unit 301 operates as a client of the wireless LAN. For example, the client unit 301 uses the wireless communication module 203 to discover an access point, establish and disconnect connection with the access point, transmit and receive data to and from the access point, and the like.

An access point unit 302 operates as an access point of the wireless LAN. For example, the access point unit 302 uses the wireless communication module 203 to broadcast identification information (for example, a service set identifier (SSID)) of the access point, establish and disconnect connection with the client, transmit and receive data to and from the client, and the like.

A state acquisition unit 303 acquires an operating state of the wireless communication module 203. The operating state of the wireless communication module 203 acquired by the state acquisition unit 303 may include a communication state between the access providing device and the wireless communication module 203. The communication state of the wireless communication module 203 may include an elapsed time from when the wireless communication module 203 is connected to the access providing device. The state acquisition unit 303 may measure the elapsed time using an internal clock (not illustrated) included in the wireless communication device 101. The communication state of the wireless communication module 203 may also include communication quality between the access providing device and the wireless communication module 203. The communication quality may be, for example, reception strength (for example, the RSSI) of a signal broadcast by the access providing device. Instead of or in addition to this, the operating state of the wireless communication device 101 acquired by the state acquisition unit 303 may include a movement speed of the wireless communication module 203. The state acquisition unit 303 may acquire a speed of the vehicle 100 from a vehicle speed sensor mounted in the vehicle 100 through the connection interface 204 and may regard this speed as a movement speed of the wireless communication module 203. Instead of this, the state acquisition unit 303 may measure the movement speed of the wireless communication module 203 using a speed sensor (not illustrated) included in the wireless communication device 101.

A notification determination unit 304 determines whether to satisfy a notification criterion for notifying another wireless communication device that the wireless communication module 203 can relay access to the wide area network 120. Details of this notification criterion will be described below. An information notification unit 305 provides information included in the wireless communication device 101 to another wireless communication device. For example, the information notification unit 305 may notify another wireless communication device that the wireless communication module 203 can relay access to the wide area network 120. Details of the information notified of by the information notification unit 305 will be described below.

An upper limit setting unit 306 sets an upper limit of the number of wireless communication devices that can be relayed by the wireless communication module 203 operating as an access point or an upper limit of the number of hops of wireless communication devices that can be relayed by the wireless communication module 203 operating as an access point. The upper limit setting unit 306 may set only one or both of the upper limit of the number of devices and the upper limit of the number of hops. The wireless communication device that can be relayed by the wireless communication module 203 operating as an access point may include not only a wireless communication device directly connected to the wireless communication module 203 (that is, without involving another wireless communication device) but also a wireless communication device indirectly connected to the wireless communication module 203 (that is, through another wireless communication device). The number of hops of the wireless communication devices that can be relayed by the wireless communication module 203 operating as an access point may be the number of other wireless communication devices passing from the client to the wireless communication module 203.

When the number of clients connected to the wireless communication module 203 is too large, the communication quality (for example, throughput) of each client deteriorates. Therefore, the wireless communication device 101 may set the upper limit of the number of wireless communication devices that can be relayed by the wireless communication module 203 and may reject a connection request from other wireless communication devices exceeding the upper limit. The upper limit setting unit 306 may set the upper limit of the number of wireless communication devices based on the communication quality between the access providing device and the wireless communication module 203. The upper limit setting unit 306 may increase the upper limit of the number of wireless communication devices when the communication quality (for example, a throughput) between the access providing device and the wireless communication module 203 is high. The upper limit setting unit 306 may decrease the upper limit of the number of wireless communication devices when the communication quality is low.

When the number of hops of the client connected to the wireless communication module 203 is too large, communication quality (for example, latency) of the client deteriorates. Therefore, the wireless communication device 101 may set the upper limit of the number of hops of the wireless communication devices that can be relayed by the wireless communication module 203 and may reject a connection request from other wireless communication devices exceeding the upper limit. The upper limit setting unit 306 may set the upper limit of the number of hops based on the communication quality between the access providing device and the wireless communication module 203. The upper limit setting unit 306 may increase the upper limit of the number of hops when the communication quality (for example, latency) between the access providing device and the wireless communication module 203 is high. The upper limit setting unit 306 may decrease the upper limit of the number of hops when the communication quality is low.

When the wireless communication module 203 operates as a client, an AP selection unit 307 selects an access point to be connected. As will be described below, the AP selection unit 307 may select an access point according to a predetermined criterion. When the client unit 301 finds a plurality of access points, the AP selection unit 307 may preferentially select an access point that has good signal quality (for example, a high RSSI).

Figure 3:
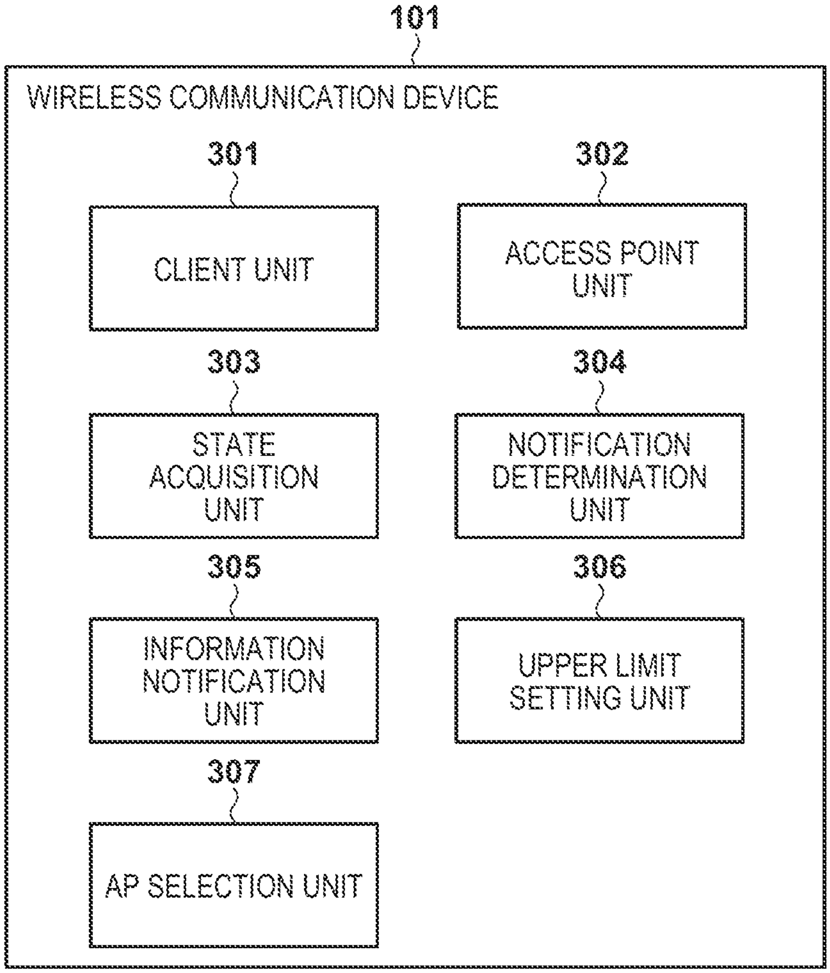
FIG. 3 is a block diagram illustrating a functional configuration example of a wireless communication device according to an embodiment.

In FIG. 3, the functional configuration in the case where the wireless communication device 101 operates as both an access point and a client has been described. When the wireless communication device 101 does not have a function as an access point, the wireless communication device 101 may not include the access point unit 302, the notification determination unit 304, the information notification unit 305, and the upper limit setting unit 306.

Figure 4:
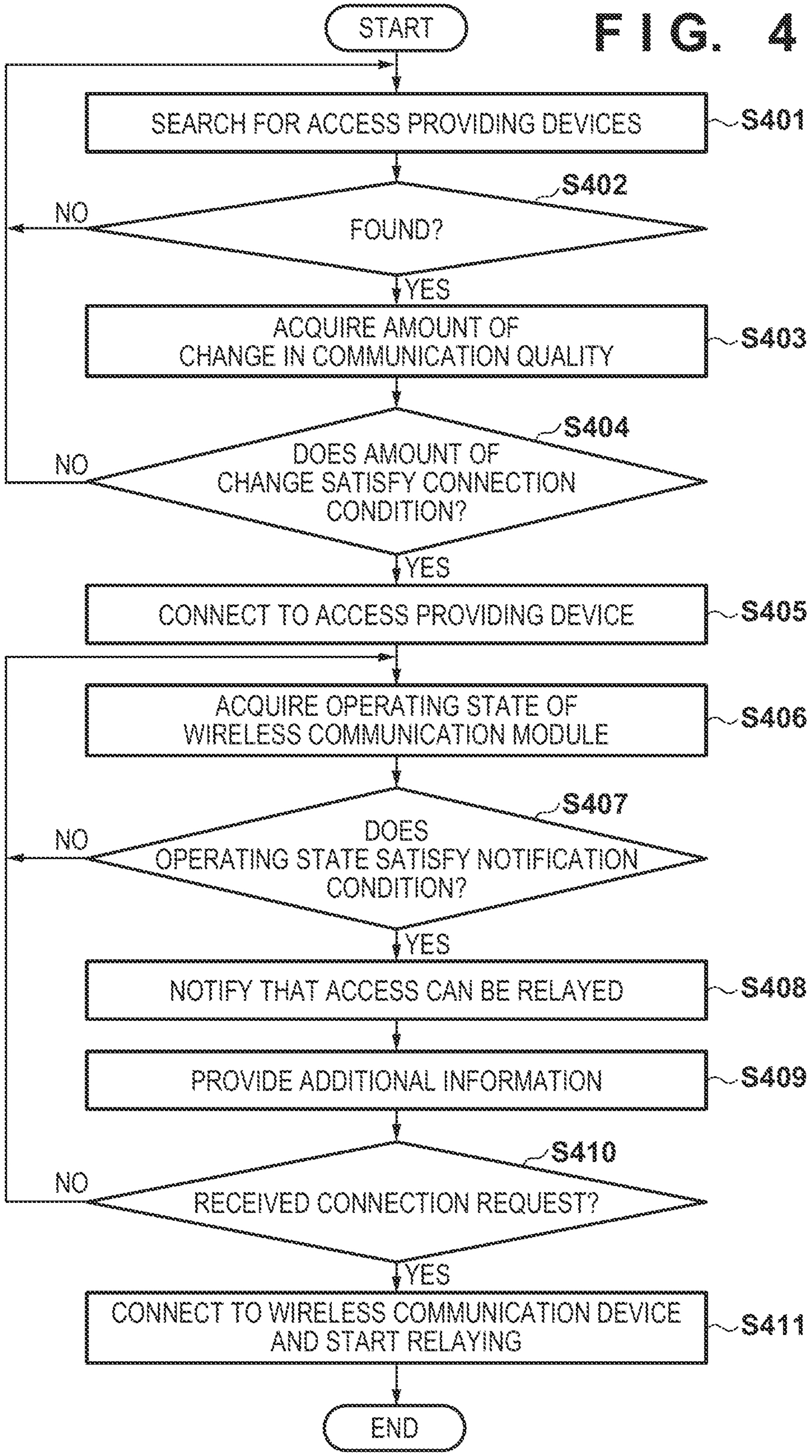
FIG. 4 is a flowchart illustrating an exemplary operation of a wireless communication device according to an embodiment.

An exemplary operation of the wireless communication device 101 before connection to the access providing device will be described with reference to FIG. 4. It is assumed that the wireless communication device 101 is not connected to any access providing device at the start of FIG. 4. The method of FIG. 4 may be started in response to activation of the wireless communication device 101 or may be started in response to an instruction from a user of the wireless communication device 101. Each step of FIG. 4 may be performed by the processor 201 executing a program stored in the memory 202.

In step S401, the wireless communication device 101 (for example, the client unit 301 thereof) searches for nearby access providing devices. As described above, the access providing device is a device capable of providing the wireless communication device 101 with access to the wide area network 120. For example, the communication device 110 is an access providing device because the communication device 110 can access the wide area network 120 and operates as an access point of a wireless LAN. In the example of FIG. 1, the wireless communication device 101A of the vehicle 100A is an access providing device when the wireless communication device 101A can access the wide area network 120 (for example, through the communication device 110) and operates as an access point. Although the wireless communication device 101A can access the wide area network 120, another wireless communication device cannot be connected to the wireless communication device 101A, and thus the wireless communication device does not serve as an access providing device if the wireless communication device does not operate as an access point. Although the wireless communication device 101A operates as an access point, another wireless communication device cannot access the wide area network 120 through the wireless communication device 101A, and thus the wireless communication device does not serve as an access providing device if the wireless communication device cannot access the wide area network 120. The access providing device broadcasts a notification that access to the wide area network 120 can be provided. For example, the SSID broadcast by the access providing device corresponds to the notification that access to the wide area network 120 can be provided. The wireless communication device 101 searches for an access providing device that performs such a notification.

In step S402, the wireless communication device 101 (for example, the AP selection unit 307 thereof) determines whether an access providing device has been found in the vicinity. When an access providing device has been found ("YES" in step S402), the wireless communication device 101 shifts the process to step S403. Otherwise ("NO" in step S402), the wireless communication device shifts the process to step S401 and continues to search for an access providing device. The wireless communication device 101 may determine that an access providing device has been found in response to reception of the notification that the access to the wide area network 120 can be provided.

In step S403, the wireless communication device 101 (for example, the state acquisition unit 303 thereof) acquires an amount of change in communication quality between the found access providing device and the wireless communication module 203 of the wireless communication device 101. The communication quality may be reception strength (for example, the RSSI) of a signal broadcast by the access providing device. The amount of change in the communication quality may be an amount of change in the communication quality of a predetermined time (for example, 1 second).

In step S404, the wireless communication device 101 (for example, the AP selection unit 307 thereof) determines whether the amount of change in the communication quality satisfies the connection condition. When the amount of change satisfies the connection condition ("YES" in step S404), the wireless communication device 101 shifts the process to step S405. Otherwise ("NO" in step S404), the wireless communication device shifts the process to step S401, excludes the access providing device that does not satisfy the connection condition from connection candidates, and continues to search for a new access providing device.

The connection condition is a condition that the wireless communication device 101 is connected as a client to the found access providing device, and is stored in the memory 202 in advance, for example. The connection condition may include a condition based on an amount of change in communication quality between the found access providing device and the wireless communication module 203 of the wireless communication device 101. For example, the connection condition may include a condition that the amount of change in the communication quality is equal to or greater than a lower limit threshold and is equal to or less than the upper limit threshold. The amount of change in the communication quality is a positive value when the communication quality is improved. The amount of change in the communication quality is a negative value when the communication quality deteriorates. The fact that the amount of change in the communication quality is greater than the upper limit threshold means that the communication quality is considerably improved more than the upper limit threshold. When the amount of change in the communication quality is less than the lower limit threshold, this means that the communication quality is considerably lowered more than the lower limit threshold.

In general, the quality of communication between the access providing device (access point) and the wireless communication module 203 (client) depends on the distance therebetween. Therefore, it is assumed that a distance between the access providing device and the wireless communication module is close when the amount of change in the communication quality is positive, and the distance therebetween is far when the amount of change in the communication quality is negative.

When the distance between the access providing device and the wireless communication module 203 becomes away at a pace exceeding a threshold, it is assumed that the connection is immediately disconnected even if the wireless communication module 203 is connected to the access providing device. Therefore, the AP selection unit 307 selects non-connection to such an access providing device. For example, it is assumed that the wireless communication device 101D of the vehicle 100D operates as an access providing device in the positional relationship of the vehicle illustrated in FIG. 1 and the wireless communication device 101A of the vehicle 100A finds the access providing device. Since the vehicle 100D is traveling behind the vehicle 100A in a direction opposite to that of the vehicle 100A, the distance between the vehicles is large. When a speed at which the vehicle is moving away is large, the amount of change in communication quality is less than the lower limit threshold. Therefore, the wireless communication device 101A is not connected to the wireless communication device 101D.

Even when the distance between the access providing device and the wireless communication module 203 becomes close at a pace exceeding the threshold, it is assumed that the connection is immediately disconnected even if the wireless communication module 203 is connected to the access providing device. Therefore, the AP selection unit 307 selects non-connection to such an access providing device. For example, it is assumed that the wireless communication device 101C of the vehicle 100C operates as an access providing device in the positional relationship of the vehicle illustrated in FIG. 1 and the wireless communication device 101A of the vehicle 100A finds the access providing device. Since the vehicle 100C is traveling in front of the vehicle 100A in a direction opposite to that of the vehicle 100A, a distance between the vehicles becomes close. When a speed at which the vehicles become close is large, the amount of change in communication quality is greater than the upper limit threshold. It is expected that the vehicle 100A and the vehicle 100C move away at a high speed after passing each other. Accordingly, the wireless communication device 101A is not connected to the wireless communication device 101C.

When the amount of change in the communication quality between the access providing device and the wireless communication module 203 of the wireless communication device 101 is equal to or larger than the lower limit threshold and is equal to or smaller than the upper limit threshold, it is assumed that the wireless communication module 203 can maintain the connection with the access providing device for a certain time. For example, it is assumed that the wireless communication device 101A of the vehicle 100A operates as an access providing device in the positional relationship of the vehicle illustrated in FIG. 1, and the wireless communication device 101B of the vehicle 100B finds the access providing device. Since the vehicles 100A and 100B are traveling in the same direction, the amount of change in communication quality falls between the lower limit threshold and the upper limit threshold. In this case, it is assumed that the connection between the wireless communication devices 101A and 101B can be maintained for a certain time. Therefore, the wireless communication device 101B is connected to the wireless communication device 101A. In another example, it is assumed that the wireless communication device 101B of the vehicle 100B finds the communication device 110 as the access providing device. When the amount of change in communication quality falls between the lower limit threshold and the upper limit threshold, it is assumed that the vehicle 100B is traveling at a low speed at an intersection or temporarily stops at the intersection. In this case, it is assumed that the connection between the communication device 110 and the wireless communication device 101B can be maintained for a certain time. Therefore, the wireless communication device 101B is connected to the communication device 110.

The connection condition may include a condition other than the above-described condition related to the amount of change in communication quality. Specific examples of other conditions will be described below.

In step S405, the wireless communication device 101 (for example, the client unit 301 thereof) is connected to the access providing device. Since the wireless communication device 101 can communicate with the access providing device through this connection, the wireless communication device 101 can access the wide area network 120. The subsequent steps are performed when the wireless communication device 101 can access the wide area network 120, and therefore the wireless communication device 101 itself can also operate as an access providing device. When the wireless communication device 101 does not have a function of an access point, subsequent steps may be omitted.

In step S406, the wireless communication device 101 (for example, the state acquisition unit 303 thereof) acquires the operating state of the wireless communication module 203 after the wireless communication module 203 is connected to the access providing device. The operating state of the wireless communication module 203 may include a communication state between the access providing device and the wireless communication module 203 and a movement speed of the wireless communication module 203. The communication state between the access providing device and the wireless communication module 203 may include an elapsed time from when the wireless communication module

203 is connected to the access providing device and communication quality between the access providing device and the wireless communication module 203. The wireless communication device 101 may acquire all of the operating states or may acquire some of the operating states. As described above, the wireless communication device 101 (for example, the upper limit setting unit 306) may set the upper limit of the number of devices or the upper limit of the number of hops based on the acquired communication quality.

In step S407, the wireless communication device 101 (for example, the notification determination unit 304 thereof) determines whether the acquired operation state satisfies a notification condition. When the acquired operation state satisfies the notification condition ("YES" in step S407), the wireless communication device 101 shifts the process to step S408. Otherwise ("NO" in step S407), the wireless communication device 101 shifts the process to step S406. When the process shifts to step S406, the wireless communication device 101 acquires the operation state of the wireless communication module 203 again and determines whether the new operation state satisfies the notification condition.

The notification condition is a condition for notifying another wireless communication device that the wireless communication module 203 can relay access to the wide area network 120, that is, that the wireless communication device 101 can operate as an access providing device, and is stored in the memory 202 in advance, for example.

The notification condition may include a condition related to a communication state between the access providing device and the wireless communication module 203. For example, the notification condition may include a condition related to an elapsed time after the wireless communication module 203 is connected to the access providing device. Specifically, the wireless communication device 101 may determine to perform the above-described notification when the elapsed time exceeds a threshold time. The wireless communication device 101 may determine not to perform the above-described notification when the elapsed time is equal to or less than the threshold time. While the elapsed time is short, the connection between the access providing device and the wireless communication module 203 may be immediately disconnected. Accordingly, in response to the continuous connection to the access providing device despite of the elapse of the threshold time, the wireless communication device 101 notifies another wireless communication device that the access to the wide area network 120 can be provided.

The notification condition may include a condition related to communication quality (for example, a throughput, latency, and the like) between the access providing device and the wireless communication module 203. Specifically, the wireless communication device 101 may determine to perform the above-described notification when the communication quality exceeds threshold quality. The wireless communication device 101 may determine not to perform the above-described notification when the communication quality is equal to or less than the threshold quality. When the communication quality is high, it is considered that the wireless communication device is worth operating as an access point of another wireless communication device despite the short-time connection. Accordingly, in response to the communication quality with the access providing device which is higher than the threshold quality, the wireless communication device 101 notifies other wireless communication devices that access to the wide area network 120 can be provided.

The notification condition may include a condition related to a movement speed of the wireless communication module 203. Specifically, the wireless communication device 101 may determine to perform the above-described notification when the movement speed is equal to or less than a threshold speed. The wireless communication device 101 may determine not to perform the above-described notification when the movement speed exceeds the threshold speed. As the movement speed of the wireless communication module 203 is higher, the wireless communication module 203 more easily deviates from the communication range of the access providing device. Accordingly, in response to the movement speed of the wireless communication module 203 which is equal to or lower than the threshold speed, the wireless communication device 101 notifies another wireless communication device that access to the wide area network 120 can be provided.

The connection condition may be a condition that all the above-described conditions are satisfied at the same time or may be a condition that at least one of the above-described conditions is satisfied.

In step S408, the wireless communication device 101 (for example, the access point unit 302 thereof) notifies another wireless communication device that access to the wide area network 120 can be relayed. The notification may be broadcast identification information (for example, an SSID) of the wireless communication module 203 functioning as an access point. Alternatively, the wireless communication device 101 may perform this notification in accordance with another method.

In step S409, the wireless communication device 101 (for example, the information notification unit 305) notifies the other wireless communication device of other information that can be used to determine whether the other wireless communication device is connected to the wireless communication device 101. This step may be omitted. The information notified in this step may include, for example, identification information (for example, an SSID) of an access providing device to which the wireless communication device 101 is connected. In addition to or instead of this, the information notified of in this step may include communication quality between the wireless communication device 101 and the access providing device to which the wireless communication device 101 is connected. The information notified in this step may include the upper limit of the number of devices or the upper limit of the number of hops set by the upper limit setting unit 306. The other wireless communication device 101 (a client) receiving the information may determine whether to make connection to the wireless communication device 101 (the access point) based on the information.

In step S410, the wireless communication device 101 (for example, the access point unit 302 thereof) determines whether a connection request has been received from another wireless communication device. When the connection request is received ("YES" in step S410), the wireless communication device 101 shifts the process to step S411. Otherwise ("NO" in step S410), the wireless communication device shifts the process to step S406. When the process shifts to step S406, the wireless communication device 101 acquires the state of the wireless communication module 203 again and determines whether the new state satisfies the notification condition. When the notification condition is no longer satisfied, the wireless communication device 101 may end the notification that the device can operate as the access providing device.

In step S411, the wireless communication device 101 (for example, the access point unit 302 thereof) establishes connection with another wireless communication device and starts relaying communication between the other wireless communication device and the access providing device.

Figure 5:
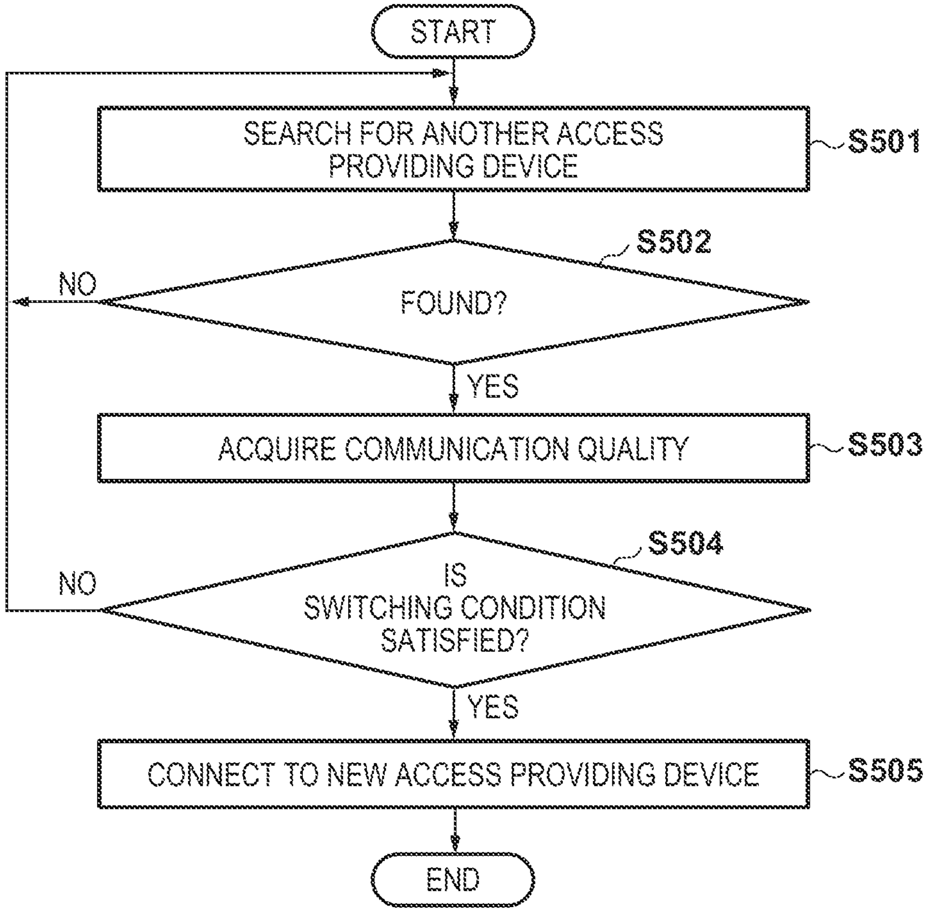
FIG. 5 is a flowchart illustrating an exemplary operation of a wireless communication device according to an embodiment.

Next, an exemplary operation of the wireless communication device 101 which is being connected to the access providing device will be described with reference to FIG. 5. The method of FIG. 5 may be started in response to connection of the wireless communication device 101 to the access providing device or may be started in response to an instruction from a user of the wireless communication device 101. Each step of FIG. 5 may be performed by the processor 201 executing a program stored in the memory 202.

In step S501, the wireless communication device 101 (for example, the client unit 301 thereof) searches for an access providing device different from the access providing device which is being connected. The method of searching for an access providing device may be similar to that in step S401 described above.

In step S502, the wireless communication device 101 (for example, the AP selection unit 307 thereof) determines whether an access providing device different from the access providing device being connected is found. When an access providing device is found ("YES" in step S502), the wireless communication device 101 shifts the process to step S503. Otherwise ("NO" in step S502), the wireless communication device shifts the process to step S501 and continues to search for an access providing device. The wireless communication device 101 may determine that an access providing device has been found in response to reception of the notification that the access to the wide area network 120 can be provided.

In step S503, the wireless communication device 101 (for example, the AP selection unit 307 thereof) acquires the communication quality between the access providing device which is being connected and the wireless communication module 203 and the communication quality between the access providing device and the wireless communication module 203 found in step S502. The former communication quality is referred to as present communication quality and the latter communication quality is referred to as switching candidate communication quality. The communication quality acquired in this step may be, for example, an RSSI, a throughput, or latency.

In step S504, the wireless communication device 101 (for example, the AP selection unit 307 thereof) determines whether a switching condition for switching the presently connected access providing device to another access providing device is satisfied. When the switching condition is satisfied ("YES" in step S504), the wireless communication device 101 shifts the process to step S505. Otherwise ("NO" in step S504), the wireless communication device shifts the process to step S501 and continues to search for an access providing device. The switching condition may include a condition related to the switching candidate communication quality and the condition may also be related to present communication quality. For example, the switching condition may include a condition related to comparison between the present communication quality and the switching candidate communication quality. Specifically, the switching condition may include a condition that the switching candidate communication quality is higher than the present communication quality by the threshold quality.

Further, the switching condition may include a condition that the identification information received from the access providing device which is being connected is equal to the access providing device found in step S502. As described above, in step S409, the access providing device which is presently being connected (for example, the wireless communication device 101A) further notifies the identification information of the access providing device which is presently being connected (for example, the communication device 110). A wireless communication device determining a switching condition (for example, the wireless communication device 101B) may have a switching condition that an access providing device (for example, the communication device 110) upstream of an access providing device which is being connected (for example, the wireless communication device 101A) is found in step S502. Accordingly, the wireless communication device 101 can reduce the number of hops for accessing the wide area network 120 while remaining to belong to the same wireless LAN.

In step S505, the wireless communication device 101 (for example, the AP selection unit 307 thereof) is connected to the access providing device found in step S502 and disconnects the connection to the access providing device which has been connected until then.

Summary of Embodiments

<Item 1>

A wireless communication device (101) comprising:

a wireless communication unit (203) configured to perform wireless communication;

an acquisition unit (303) configured to acquire an operating state of the wireless communication unit after the wireless communication unit is connected to an access providing device (101, 110) capable of providing access to a network (120);

a determination unit (304) configured to determine whether the operating state of the wireless communication unit satisfies a notification condition; and a notification unit (305) configured to notify another wireless communication device (101) that the wireless communication unit is capable of relaying access to the network in a case where it is determined that the operating state of the wireless communication unit satisfies the notification condition.

According to this item, since the wireless communication device that is not suitable to operate as an access providing device does not operate as an access point, the wireless communication device can appropriately select a connection destination.

<Item 2>

The wireless communication device according to item 1, wherein the wireless communication unit relays access to the network by the other wireless communication device through the access providing device.

According to this item, the plurality of wireless communication devices can be relayed to access a network.

<Item 3>

The wireless communication device according to item 1 or 2, wherein the operating state acquired by the acquisition unit includes a communication state between the access providing device and the wireless communication unit, and the notification condition includes a condition related to the communication state.

According to this item, a notification can be appropriately performed based on the communication state.

<Item 4>

The wireless communication device according to item 3, wherein the operating state acquired by the acquisition unit includes an elapsed time from when the wireless communication unit is connected to the access providing device, and the notification condition includes a condition related to the elapsed time.

According to this item, a notification can be appropriately performed based on the elapsed time.

<Item 5>

The wireless communication device according to item 3 or 4, wherein the operating state acquired by the acquisition unit includes communication quality between the access providing device and the wireless communication unit, and the notification condition includes a condition related to the communication quality.

According to this item, a notification can be appropriately performed based on the communication quality.

<Item 6>

The wireless communication device according to any one of items 1-5, wherein the operating state acquired by the acquisition unit includes a movement speed of the wireless communication unit, and the notification condition includes a condition related to the movement speed.

According to this item, a notification can be appropriately performed based on the movement speed.

<Item 7>

The wireless communication device according to any one of items 1-6, wherein the acquisition unit further acquires identification information of the access providing device, and the notification unit notifies the other wireless communication device of the identification information of the access providing device.

According to this item, a wireless communication terminal operating as the client can appropriately select the connection destination based on the notified identification information.

<Item 8>

The wireless communication device according to any one of items 1-7, wherein the operating state acquired by the acquisition unit includes communication quality between the access providing device and the wireless communication unit; and the notification unit notifies the other wireless communication device of the communication quality.

According to this item, the wireless communication terminal operating as the client can appropriately select the connection destination based on the notified communication quality.

<Item 9>

The wireless communication device according to any one of items 1-8, wherein the notification unit notifies the other wireless communication device of an upper limit of a number of wireless communication devices which are able to be relayed by the wireless communication unit or an upper limit of a number of hops of the wireless communication devices which are able to be relayed by the wireless communication unit.

According to this item, the wireless communication terminal operating as the client can appropriately select the connection destination based on the notified upper limit.

<Item 10>

The wireless communication device according to item 9, wherein the operating state acquired by the acquisition unit includes communication quality between the access providing device and the wireless communication unit, and the wireless communication device further comprises a setting unit (306) configured to set the upper limit of the number of wireless communication devices or the upper limit of the number of hops based on the communication quality.

According to this embodiment, the upper limit can be appropriately set.

<Item 11>

The wireless communication device according to any one of items 1-10, wherein the access providing device operates as an access point of a wireless local area network.

According to this item, the above-described embodiments can be applied to a wireless local area network.

<Item 12>

A wireless communication device (101) comprising:

a wireless communication unit (203) configured to perform wireless communication;

a receiving unit (301) configured to receive, from an access providing device (101, 110), a notification that access to a network (120) is able to be provided;

an acquisition unit (303) configured to acquire an amount of change in communication quality between the access providing device and the wireless communication unit; and a determination unit (307) configured to determine whether to make connection to the access providing device based on the amount of change in the communication quality.

According to this item, since it is possible to avoid connection to an access point assumed to be disconnected in a short time, the wireless communication device can appropriately select a connection destination.

<Item 13>

The wireless communication device according to item 12, wherein the access providing device is a first access providing device, the receiving unit receives, from a second access providing device, a notification that access to the network is able to be provided while the wireless communication unit is connected to the first access providing device, and the wireless communication unit is connected to the second access providing device when a switching condition is satisfied.

According to this item, the connection destination can be appropriately switched.

<Item 14>

The wireless communication device according to item 13, wherein the switching condition includes a condition that identification information received from the first access providing device is identical to identification information of the second access providing device and communication quality between the second access providing device and the wireless communication unit satisfies a predetermined condition.

According to this item, the number of hops can be reduced while the device remains to belong to the same wireless LAN.

<Item 15>

A vehicle (100) comprising the wireless communication device according to any one of items 1-14.

According to this item, the above-described embodiment can be applied to the vehicle.

<Item 16>

A program causing a computer (101) to function as each unit of the wireless communication device according to any one of items 1-14.

According to this item, the above-described embodiment can be applied to the program.

<Item 17>

A wireless communication system comprising:

an access providing device (101, 110) capable of providing access to a network (120); and a wireless communication device (101) that is able to be connected to the access providing device, wherein the wireless communication device is configured to:

acquire an operating state of the wireless communication device after connected to the access providing device, determine whether the operating state of the wireless communication device satisfies a notification condition, and notify another wireless communication device (101) that the wireless communication device is capable of relaying access to the network in a case where it is determined that the operating state of the wireless communication device satisfies the notification condition.

According to this item, since the wireless communication device that is not suitable to operate as an access providing device does not operate as an access point, the wireless communication device can appropriately select a connection destination.

<Item 18>

A method for controlling a wireless communication device (101), the method comprising:

acquiring (S406) an operating state of the wireless communication device after the wireless communication device is connected to an access providing device (101, 110) capable of providing access to a network (120);

determining (S407) whether the operating state of the wireless communication device satisfies a notification condition; and notifying (S408) another wireless communication device (101) that the wireless communication device is capable of relaying access to the network in a case where it is determined that the operating state of the wireless communication device satisfies the notification condition.

According to this item, since the wireless communication device that is not suitable to operate as an access providing device does not operate as an access point, the wireless communication device can appropriately select a connection destination.

<Item 19>

A method for controlling a wireless communication device (101), the method comprising:

receiving (S402), from an access providing device (101, 110), a notification that access to a network (120) is able to be provided;

acquiring (S403) an amount of change in communication quality between the access providing device and the wireless communication device; and determining (S404) whether to make connection to the access providing device based on the amount of change in the communication quality.

According to this item, since it is possible to avoid connection to an access point assumed to be disconnected in a short time, the wireless communication device can appropriately select a connection destination.

The invention is not limited to the foregoing embodiments, and various variations/changes are possible within the spirit of the invention.

What is claimed is:

1. A wireless communication device comprising: a wireless communication unit configured to perform wireless communication; an acquisition unit configured to acquire an operating state of the wireless communication unit after the wireless communication unit is connected to an access providing device capable of providing access to a network; a determination unit configured to determine whether the operating state of the wireless communication unit satisfies a notification condition; and a notification unit configured to notify a second wireless communication device that the wireless communication unit is capable of relaying access to the network, the access being provided via a connection between the access providing device and the wireless communication unit, in a case where it is determined that the operating state of the wireless communication unit satisfies the notification condition, wherein the operating state acquired by the acquisition unit includes an elapsed time from when the wireless communication unit is connected to the access providing device, wherein the notification condition includes a condition related to the elapsed time, and wherein the notification unit notifies the second wireless communication device that the wireless communication unit is capable of relaying the access between the second wireless communication device and the network, in a case where the elapsed time exceeds a threshold time, wherein the operating state acquired by the acquisition unit includes communication quality between the access providing device and the wireless communication unit, and the wireless communication device further comprises a setting unit configured to set the upper limit of the number of wireless communication devices or the upper limit of the number of hops based on the communication quality.

2. The wireless communication device according to claim 1, wherein the wireless communication unit relays access to the network by the second wireless communication device through the access providing device.

3. The wireless communication device according to claim 1, wherein the operating state acquired by the acquisition unit includes a communication state between the access providing device and the wireless communication unit, and the notification condition includes a condition related to the communication state.

4. The wireless communication device according to claim 3, wherein the operating state acquired by the acquisition unit includes communication quality between the access providing device and the wireless communication unit, and the notification condition includes a condition related to the communication quality.

5. The wireless communication device according to claim 1, wherein the operating state acquired by the acquisition unit includes a movement speed of the wireless communication unit, and the notification condition includes a condition related to the movement speed.

6. The wireless communication device according to claim 1, whin the acquisition unit further acquires identification information of the access providing device, and the notification unit notifies the second wireless communication device of the identification information of the access providing device.

7. The wireless communication device according to claim 1, wherein the operating state acquired by the acquisition unit includes communication quality between the access providing device and the wireless communication un and the notification unit notifies the second wireless communication device of the communication quality.

8. The wireless communication device according to claim 1, wherein the notification unit notifies the second wireless communication device of an upper limit of a number of wireless communication devices which are able to be relayed by the wireless communication unit or an upper limit of a number of hops of the wireless communication devices which are able to be relayed by the wireless communication unit.

9. The wireless communication device according to claim 1, wherein the access providing device operates as an access point of a wireless local area network.

10. A vehicle comprising the wireless communication device according to claim 1.

11. A non-transitory storage medium comprising a program causing a computer to function as each unit of the wireless communication device according to claim 1.

12. A wireless communication device comprising: a wireless communication unit configured to perform wireless communication a receiving unit configured to receive, from each of a plurality of access providing devices, a notification that access between the wireless communication device and a network is able to be provided; a specifying unit configured to specify a quality of a signal received from each of the plurality of access providing devices; and a determination unit configured to determine to make connection to an access providing device having a highest quality of the signal, wherein the plurality of access providing devices include a first access providing device and a second access providing device, wherein the receiving unit receives, from the second access providing device, a notification that access between the wireless communication device and the network is able to be provided while the wireless communication unit is connected to the first access providing device, and wherein the wireless communication unit is connected to the second access providing device in a case where an amount of change in communication quality between the access providing apparatus and the second wireless communication device is equal to or greater than a lower limit threshold and is equal to or less than an upper limit threshold, wherein the operating state acquired by the acquisition unit includes communication quality between the access providing device and the wireless communication unit, and the wireless communication device further comprises a setting unit configured to set the upper limit of the number of wireless communication devices or the upper limit of the number of hops based on the communication quality.

13. The wireless communication device according to claim 12, wherein the switching condition includes a condition that identification information received from the first access providing device is identical to identification information of the second access providing device and communication quality between the second access providing device and the wireless communication unit satisfies a predetermined condition.

14. A vehicle comprising the wireless communication device according to claim 12.

15. A non-transitory storage medium storing a program causing a computer to function as the wireless communication device according to claim 12.

16. A wireless communication system comprising: an access providing device capable of providing access to a network; and a wireless communication device that is able to be connected to the access providing device and comprising a wireless communication unit, wherein the wireless communication device is configured to: acquire an operating state of the wireless communication device after connected to the access providing device, determine whether the operating state of the wireless communication device satisfies a notification condition, and notify a second wireless communication device that the wireless communication device is capable of relaying access to the network, the access being provided via a connection between the access providing device and the wireless communication unit, in a case where it is determined that the operating state of the wireless communication device satisfies the notification condition, wherein the operating state acquired by the acquisition unit includes communication quality between the access providing device and the wireless communication unit, and the wireless communication device further comprises a setting unit configured to set the upper limit of the number of wireless communication devices or the upper limit of the number of hops based on the communication quality.

17. A method for controlling a wireless communication device comprising a wireless communication unit, the method comprising: acquiring an operating state of the wireless communication device after the wireless communication device is connected to an access providing device capable of providing access to a network; determining whether the operating state of the wireless communication device satisfies a notification condition; and notifying a second wireless communication device that the wireless communication device is capable of relaying access to the network, the access being provided via a connection between the access providing device and the wireless communication unit, in a case where itis determined that the operating state of the wireless communication device satisfies the notification condition, wherein the operating state includes an elapsed time from when the wireless communication unit is connected to the access providing device, wherein the notification condition includes a condition related to the elapsed time, and wherein the method comprises notifying the second wireless communication device that the wireless communication unit is capable of relaying the access between the second wireless communication device and the network, in a case where the elapsed time exceeds a threshold time, wherein the operating state acquired by the acquisition unit includes communication quality between the access providing device and the wireless communication unit, and the wireless communication device further comprises a setting unit configured to set the upper limit of the number of wireless communication devices or the upper limit of the number of hops based on the communication quality.

18. A method for controlling a wireless communication device, the method comprising: receiving, from each of a plurality of access providing devices, a notification that access between the wireless communication device and a network is able to be provided; specifying a quality of a signal received from each of the plurality of access providing devices; and determining to make connection to an access providing device having a highest quality of the signal, wherein the plurality of access providing devices include a first access providing device and a second access providing device, wherein a notification that access between the wireless communication device and the network is able to be provided is received from the second access providing device while the wireless communication device is connected to the first access providing device, and wherein the wireless communication device is connected to the second access providing device in a case where an amount of change in communication quality between the access providing apparatus and the second wireless communication device is equal to or greater than a lower limit threshold and is equal to or less than an upper limit threshold, wherein the operating state acquired by the acquisition unit includes communication quality between the access providing device and the wireless communication unit, and the wireless communication device further comprises a setting unit configured to set the upper limit of the number of wireless communication devices or the upper limit of the number of hops based on the communication quality.

* * * * *